(12) United States Patent
Zhang et al.

(10) Patent No.: US 9,626,599 B2
(45) Date of Patent: Apr. 18, 2017

(54) RECONFIGURABLE CLEAR PATH DETECTION SYSTEM

(75) Inventors: Wende Zhang, Troy, MI (US); Jinsong Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1119 days.

(21) Appl. No.: 13/441,962

(22) Filed: Apr. 9, 2012

(65) Prior Publication Data

US 2013/0265424 A1 Oct. 10, 2013

(51) Int. Cl.
| | |
|---|---|
| *H04N 9/47* | (2006.01) |
| *G06K 9/62* | (2006.01) |
| *G06K 9/00* | (2006.01) |
| *B60W 40/072* | (2012.01) |

(52) U.S. Cl.
CPC ....... *G06K 9/6292* (2013.01); *G06K 9/00798* (2013.01); *B60W 40/072* (2013.01)

(58) Field of Classification Search
USPC .......................................... 348/148
See application file for complete search history.

(56) References Cited

U.S. PATENT DOCUMENTS

| | | | | |
|---|---|---|---|---|
| 2004/0247157 | A1* | 12/2004 | Lages et al. ................. | 382/103 |
| 2010/0046840 | A1* | 2/2010 | Hashiguchi et al. ......... | 382/201 |
| 2010/0104199 | A1* | 4/2010 | Zhang et al. ................ | 382/199 |
| 2011/0274315 | A1* | 11/2011 | Fan et al. ..................... | 382/103 |
| 2012/0105638 | A1* | 5/2012 | Englander .................... | 348/148 |

\* cited by examiner

*Primary Examiner* — Tracy Y Li
(74) *Attorney, Agent, or Firm* — Quinn IP Law

(57) ABSTRACT

A reconfigurable clear path detection system includes an image capture device and a primary clear path detection module for determining corresponding probability values of identified patches within a captured image representing a likelihood of whether a respective patch is a clear path of the road. A plurality of secondary clear path detection modules each are used to assist in identifying a respective clear path of the traveled road in the input image. One or more of the secondary clear path detection modules are selectively enabled for identifying the clear path. The selectively enabled secondary clear path detection modules are used to identify the clear path of the road of travel in the input image. A fusion module collectively analyzes the clear path detection results of the primary clear path detection module and the selectively enabled secondary clear path detection modules for identifying the clear path in the input image.

26 Claims, 2 Drawing Sheets

RECONFIGURABLE CLEAR PATH DETECTION SYSTEM

BACKGROUND OF INVENTION

An embodiment relates generally to road recognition.

Vision-imaging systems are used in vehicles for enhancing sensing applications within the vehicle such as clear path detection systems, object detection systems, and other vision/positioning systems. Such systems may be used to autonomously or semi-autonomously control the vehicle through steering systems, throttle control, braking control, or even utilized for lane departure warning systems.

Various techniques may be utilized for identifying a clear path for object detection. Typically, each respective technique has attributes which provide advantages in certain respects. Utilizing more than one technique would offer enhanced detection of the clear path, but would also increase the processing time for determining the clear path.

SUMMARY OF INVENTION

An embodiment contemplates a method of detecting a clear path of a road of travel for a vehicle. Images of a scene in a path of travel are captured by an image capture device. A clear path in an input image is determined by a primary clear path detection module. The primary clear path detection module analyzes the input image from the captured image device. The primary clear path detection module segments the input image into a plurality of patches. Probability values are determined for each of the patches representing a likelihood of whether a respective patch is a clear path of travel. Feature data of the input image is associated with the segmented patches. A trained classifier is applied for identifying a clear path of travel in the input image based on the feature data and the corresponding probability values. A plurality of secondary clear path detection modules is provided for independently identifying a respective clear path of the travel in the input image. One or more of the secondary clear path detection modules are selectively enabled for identifying the clear path of the travel. Only the selectively enabled secondary clear path detection modules are used for identifying the clear path of the road of travel in the input image. A fusion module collectively analyzes the clear path detection results of the primary clear path detection module and analyzes the selectively enabled secondary clear path detection modules for identifying the clear path in the input image.

An embodiment contemplates a reconfigurable clear path detection system for a vehicle. An image capture device captures images of a scene in a path of travel. A primary clear path detection module determines a clear path in an input image captured from the image capture device. A plurality of secondary clear path detection modules where each secondary clear path detection module is configured to independently assist in identifying a respective clear path of the road of travel in the input image. One or more of the secondary clear path detection modules are selectively enabled for assisting in identifying the clear path of the road of travel wherein only the selectively enabled secondary clear path detection modules are used to identify the clear path of the road of travel in the input image. A fusion module collectively analyzes the clear path detection results of the primary clear path detection module and the selectively enabled secondary clear path detection modules for identifying the clear path in the input image.

DETAILED DESCRIPTION

Figure 1:
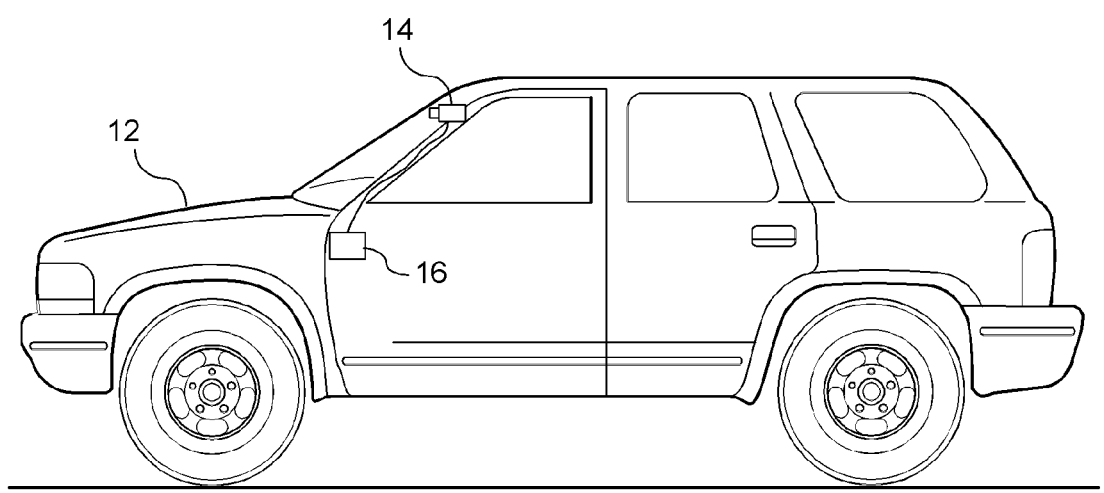
FIG. 1 is an illustration of a vehicle integrating a vehicular clear path detection system.

There is shown in FIG. 1 a vehicle integrating a reconfigurable clear path detection system for a vehicle 12. The reconfigurable clear path detection system is equipped with an image capture device 14 mounted to the vehicle 12. The image capture device 14 is in communication with a processing unit 16.

Figure 2:
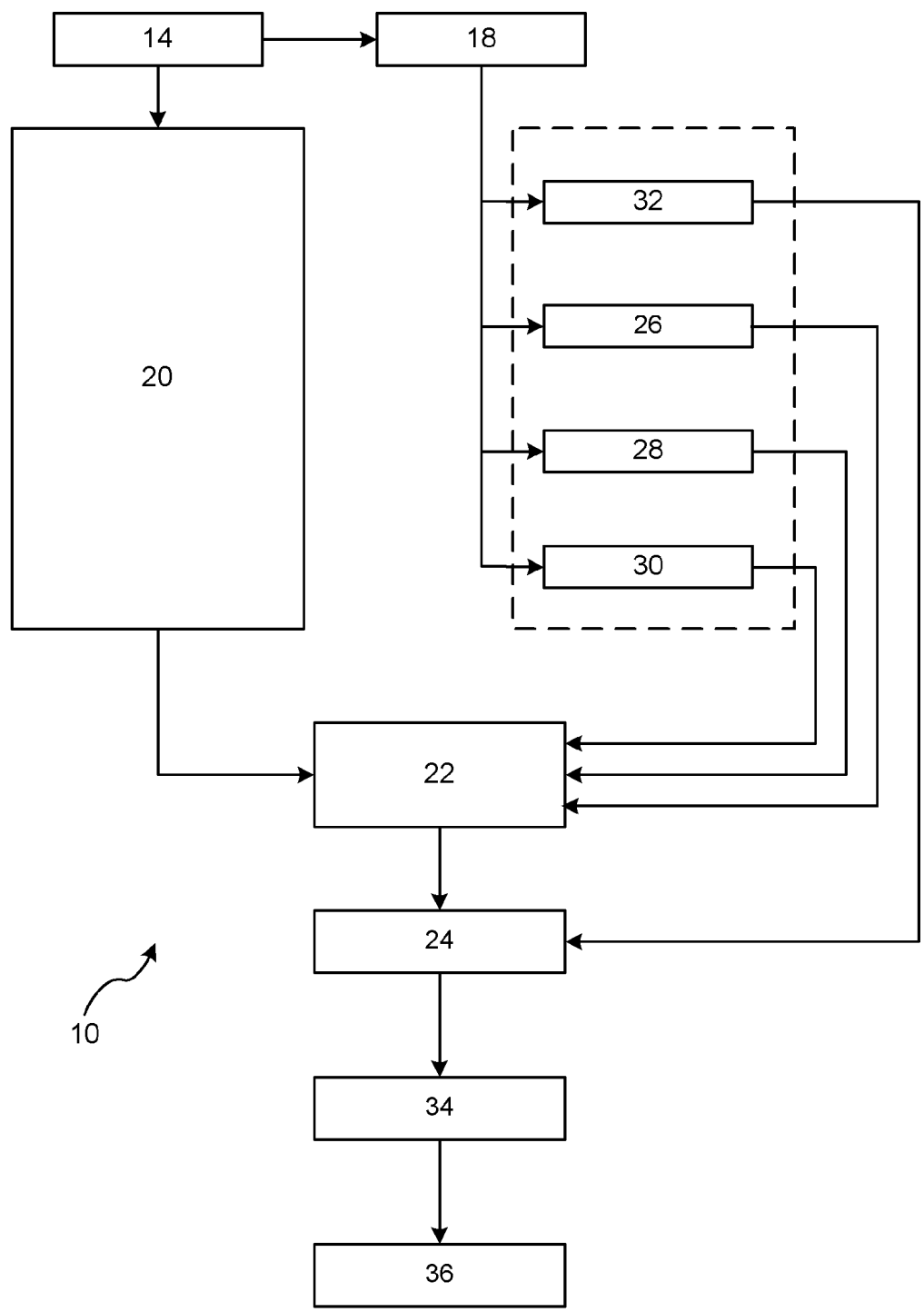
FIG. 2 is a block diagram of the reconfigurable clear path detection system.

FIG. 2 illustrates a block diagram of the reconfigurable clear path detection system 10. The reconfigurable clear path detection system 10 may further include a memory storage device 18 to store or buffer captured images, a primary clear path detection module 20, a plurality of secondary clear path detection modules, a first fusion module 22, and a second fusion module 24.

The image capture device 14 may include a camera or other imaging device. The image capture device 14 captures images forward of the vehicle that are used to identify a clear path of travel. Preferably, the image capture device 14 is configured for performing continuous image capture. The images captured by the image capture device 14 may be stored in a memory of the image capture device 14, transferred to an off-board memory device, or may be transferred to a processing unit for analysis. The processing unit may include the various clear path detection modules and fusion module or may be independent and retrieve the information from a respective off-board module. Moreover, more than one image capture device may be used in order to capture images rearward of the vehicle. Images captured rearward of the vehicle may be used in the analysis for identifying the clear path of travel forward of the vehicle.

The captured images are preferably a two-dimensional image of known pixel dimensions. The image contains a plurality of identifiable pixels. Each of the pixels includes a set of bits that correspond to a color on a predetermined color map that represents a color intensity value.

The processing unit is a single unit; however, it should be understood that functions of the processing unit may be performed by one or more devices implemented in software, hardware, and/or application-specific integrated circuitry. The processing unit, may be a general purpose processor, digital computer including a central microprocessor or central processing unit, ASIC, or other processing module having non-volatile memory, read only memory, programmable read only memory, RAM, A-to-D circuitry, D-to-A circuitry, input/output circuitry, buffering capability and appropriate signal conditioning such as digital signal processing. The processing unit 16 is devised to execute algorithms utilizing inputs from the devices described herein as well as other devices or systems within the vehicle. The processing unit determines a clear path in the captured image. The clear path is utilized in guiding the vehicle the along the road of travel. The processing unit may perform the guidance functions as described above or may transfer the results to a secondary application that performs the guidance functions.

The primary clear path detection module 20 utilizes a segmentation-based technique for detecting a clear path of the traveled road. The primary clear path detection module 20 analyzes an input image captured from the image capture device 14. The primary clear path detection module 20 segments the input image into a plurality of patches and determines probability values for each of the patches. The determined probability values of each patch represent a likelihood of whether a respective patch is a clear path of the traveled road. Feature data of the input image is associated with the segmented patches and is provided to a classifier for identifying a clear path of the traveled road based on the feature data and the corresponding probability values. Clear path detection utilizing the segmentation-based technique is described in co-pending application having a Serial No. 12/581,742 filed on Oct. 19, 2009, entitled "Clear Path Detection Using Segmentation-Based Method" which is incorporated by reference in its entirety.

The plurality of secondary clear path detection modules are selectively used in cooperation with the results from the primary clear path detection module 20 for determining a clear path for the road of travel in the captured image. The secondary clear path detection modules include, but are not limited to, an on-line similar scene detection module 26 utilizing previous reliable clear path patches, an adaptation module 28, a top-down view classification module 30, a road structure identification module 32 and a temporal coherence module 34.

The on-line similar scene detection module 26 is a technique that requires low data processing. While the vehicle is running, an image is captured in real-time and is immediately compared to various dataset image samples that include a clear path that are previously labeled and identified. That is, prior sample images stored in the memory are already classified as clear paths. A cursory comparison is performed between the current image and the samples stored in memory, such as a database, for determining whether a match is present. Since the comparison requires low data processing, a quick assessment may be utilized. This process is referred to as a pass-through since the image is not buffered for intense analyzation. If the road of travel is new and not a previously traveled road, then the on-line similar scene detection module 26 may not be utilized since there will be no familiarity with the road of travel.

The adaptation module 28 utilizes adaptive machine learning techniques that include at least two classifiers. Images obtained by the image capture device 14 are segmented into patches. Characteristic features are extracted from the images. Attributes identifiable from the captured images include color and texture. The attributes are analyzed by a first classifier, such as a support vector machine, which has been previously trained to identify clear path regions in an image. The various regions are identified by a confidence value that pertains to a likelihood of whether a respective patch is part of the clear path. The patches that have a confidence value below a predetermined threshold are analyzed by an additional classifier that is adaptively trained utilizing real-world test samples previously classified as having a high confidence level which indicates a clear path of travel. The data results from the first classifier and the additional adaptively-updated classifier are then used to make a cooperative decision relating to a clear path existence in patches of subsequent captured images. Details for clear path detection utilizing the adaptative technique is described in co-pending application having a Serial No. 12/963,426 filed on Dec. 8, 2010 entitled "Adaptation For Clear Path Detection With Additional Classifiers", and co-pending application having Ser. No. 12/963,404 filed on Dec. 8, 2010, entitled "Adaptation For Clear Path Detection Using Reliable Local Model Updating", both which are incorporated by reference in their entirety.

The top-down view classification module 30 utilizes a top-down view generator that converts one or more images obtained from the image capture device 14 into a top-down view of the road of travel. One or more images are captured by the image capture device 14. An image-warping conversion technique is applied to the image for converting the image from a front-view road of travel to a top-down view road of travel. The converted top-down image is segmented into patches. Characteristic features are extracted from the patches in the top-down view. Attributes identifiable from the converted top-down view images include color and texture. The extracted features are analyzed by a classifier, such as a support vector machine, for identifying which patches are clear path regions for the road of travel.

Each of the plurality of secondary clear path detection modules described above may identify or assist in identifying a clear path of the road of travel for the input image. In FIG. 2, clear path detection results from any of the secondary clear path detection modules are provided to the first fusion module 22 where the results are processed in cooperation with results from the primary clear path detection module 20. Each of the results provided to the first fusion module 22 are selectively combined for improving the accuracy of identifying the clear path from the input image.

Each of the secondary clear path detection modules may also be enabled or disabled when determining the clear path of the traveled road or may be selectively utilized, including selectively weighting the probabilities of the secondary clear path detection. In utilizing only a selected group of secondary clear path detection modules, the clear path detection system can select a trade-off between accuracy and the processing time in identifying the clear path. That is, a clear path detection system may be reconfigured as a trade-off based on the number of modules selected which relates directly to the accuracy and time of performance of the system as a whole.

Increasing the number of clear path detection techniques that are executed in cooperation with the primary clear path detection module 12 increases the confidence level that the clear path of travel has been properly identified. However, while each additional second clear path detection technique increases the confidence level accurately identifying the clear path, the processing time required for executing each of the selected modules increases. Therefore, only a selected number of secondary clear path detection techniques may be executed for optimizing a trade-off between accuracy and performance time.

Identifying a region that the vehicle typically travels may assist in determining which clear path detection techniques may be best suited for identifying the clear path as certain techniques may provide no additional benefit with respect to accuracy in identifying the clear path of the road of travel. For example, if the vehicle primarily travels in an urban environment, then a secondary clear path detection module such as the road structure tracking technique utilizing vanish point-line detection may not increase the accuracy of the results as a vanishing point in an urban environment may be difficult to detect. Therefore, the clear path detection system can be reconfigured to either not execute a respective secondary clear path detection module or apply a weight of zero to the results from that respective technique. As a result, only those secondary clear path detection techniques that are beneficial from either an accuracy perspective or a processing speed perspective in identifying the clear path may be selected.

In the first fusion module 22, the results from each of the clear path detection modules are weighted for determining a degree as to which each of the results will be respectively relied on and utilized. The following equation represents a weighted formula for applying each of the respective results from the clear path detection results as described above. The formula is represented as follows:

$$P_{fuse}(c) = \frac{w_{offline} \cdot P_{offline}(c) + w_{online} \cdot P_{online}(c) + w_{topview} \cdot P_{topview}(c) + w_{adapt} \cdot P_{adapt}(c)}{w_{offline} + w_{online} + w_{topview} + w_{adapt}}$$

The fused clear-path likelihood $P_{fuse}(c)$ is determined as a function of a weighted linear combination of offline SVM classification probability $P_{offline}(c)$, an online similar scene classification probability $P_{online}(c)$, a top-down view classification probability $P_{topview}(c)$, and the adaption likelihood $P_{adapt}(c)$. The weights of the four module outputs $w_{offline}$, $w_{online}$, $w_{topview}$, and $w_{adapt}$, may be equal (e.g., ¼) or a regression method can be utilized to generate an optimal weight for each module. As a result, the reconfigurable clear path detection system can utilize only the primary clear path detection module 20 or can selectively include any combination of the other three modules.

The results from the first fusion module 22 are then applied to the second fusion module 24. The second fusion module 24 utilizes the results of the first fusion module 22 and factors in road structure constraints. Weighting is used to determine a degree as to which the road structure constraints are used in the second fusion module 24. Weighting is based on a probabilistic framework. A confidence map is generated based on the road structure detection result. The confidence map is applied to the probability map of the clear path classification for refining the clear path detection result.

In block 24, the results from the first fusion module 22 are provided to second fusion module 24. Results from the road structure identification module 32 are in cooperation with the results from the first fusion module 22 to gain enhanced confidence of identifying the clear path.

In the road structure identification module 32, vanishing point and potential road edges are detected for identifying boundaries of the road which is used to identify the clear path. The road structure identification module 32 obtains images from the image capture device 14 or memory 18. Images are provided to a line clustering and vanish-point detection sub-module. The sub-module utilizes an illumination intensity image and a yellow image transformed from the captured input image and performs edge analysis on the illumination intensity image and the yellow image for detecting line candidates. Edge filters are applied on the illumination intensity image to obtain vertical and horizontal gradients, which are then used to determine gradient magnitude and gradient angle. The gradient magnitude of each pixel is compared with a threshold to extract edge points which have a gradient magnitude larger than a predetermined threshold. The edge analysis identifies pixels associated with edges in the image data and then utilizes the edge points in the image to determine a potential line candidate.

The line candidates are detected by clustering (grouping) potential pixels associated with a potential lane marker or road curb. Line clustering involves scanning the edge pixels one by one. A connectivity of pixels is identified for clustering a respective set of pixels based on a similar gradient between the neighboring pixels. For each edge pixel, the surrounding area of a respective pixel is searched for other edge pixels which have similar gradient angle to the respective pixel. The pixels having similar gradient angles are grouped together and assigned a same line index. After scanning and grouping each of the pixels, line groups which are longer than a respective length and vertical direction spreading are extracted and identified as potential line clusters for further processing. As a result, potential line-clusters are identified based on those clusters having gradient angle similarity and local connectivity.

Line clusters identified in the illumination intensity image and the yellow image are merged and potential line candidate detection is performed on the merged line clusters. Potential line candidates may be identified from any of the bright line strips, dark line strips, and elongated line strips (i.e., lines that extend a substantial distance in the image).

Vanishing point detection is applied based on the potential line candidate results. A vanishing point is estimated based on the identified bright strips and the long dark strips. In addition, other dark strips and single long lines are identified for refining the vanishing point. Lines terminating that are in close proximity to the estimated initial vanishing point are selected for refining the vanishing point. As a result, the road structure is identified based on the detected lines as described herein.

After the vanishing point is determined, lines in close proximity to the estimated vanishing points are identified. For each of the identified lines in close proximity to the estimated vanishing points, features are extracted from the image. Classification analysis is performed on the candidate features of categorized left and right line clusters that represent reliable road edges.

In the second fusion module 24, a confidence map is generated for which high confidence is assigned to the region or regions between the detected road edges detected by the road structure identification module 32 and low confidence value is assigned to the region or regions outside of the detected road edges. For those segmentation patches that fall in the region outside of the identified road edges, the likelihood of that segmentation patch being part of the clear path is decreased. This is performed by fusing their associated probability as determined in the first fusion module 22 with the confidence map generated from the road structure identification module 32. The formula for determining the probability of the clear path as a function to the identified road structure is represented by the following formula:

$$P_{rdstr\_fuse}(c) = \text{Conf}_{rd\_edge}(c) \cdot P_{fuse}(c)$$

where $P_{fuse}(c)$ is the probability of the clear path for a respective segmented patch generated by the first fusion module 22, and $\text{Conf}_{rd\_edge}$ is the confidence value assigned to the region inside or outside of the road edge.

The fusion module as described is reconfigurable, which means that the fused clear path likelihood can be utilized with or without considering road edge constraints.

The results from the second fusion module 24 are provided to the temporal coherence module 34. The temporal coherence module 34 applies temporal smoothing to the fused output data. The temporal coherence technique generates a fused clear-path likelihood from previous image frame data and current image frame data. The temporal coherence module 34 identifies patches within each of the time-displaced captured images. Features associated with patches are extracted from each image. A probability value that indicates a likelihood of a patch being part of the clear path of the traveled road is determined for each extracted feature. Each of the time-displaced images is compared and features having substantially similar appearance properties between the time-displaced images are identified. In response to the comparison of the features having substantially similar appearance properties and their associated probability values, the features indicating the clear path are determined. This technique can be represented utilizing the following formula:

$$p^{TS}(u_0 v_0) = \frac{c_0 \cdot P_0(u_0 v_0) + \sum_{t=1}^{n} c_t \cdot \delta(m_t(u_0, v_0 | u(t), v(t))) \cdot P_t(u(t), (v(t))}{c_0 + \sum_{t=1}^{n} c_t \cdot \delta(m_t(u_0, v_0 | u(t), v(t)))}.$$

A pixel location $(u_t, v_t)$ in a previous frame which corresponds to $(u_0, v_0)$ in the current frame is calculated utilizing factors such as vehicle motion and on-the-ground (clear path) assumptions. A delta function $\delta(m_t(u_0 v_0 | u_t, v_t))$ indicates whether or not the pixel $(u_t, v_t)$ in the t-th previous frame contributes to temporal smoothing, which is based on the similarity to the pixel $(u_0 v_0)$ in the current frame. The weights $c_t$, $t=0, 1, 2, \ldots$ indicate the contribution weight of each frame. The weights can be fixed equal weights which mean equal distribution among each frame, or may decay with time t which means that the previous video frame contributes less when from an earlier time.

The clear path results produced by the first fusion module 22 and the second fusion module 24 are provided to an output device 36. The output device 36 may include a display for displaying the road of travel and the clear path to the driver of the vehicle, such as the display utilized by a backup camera. The output device 36 may include a vehicle application, such as an object detection system that scans the identified clear path for detecting objects in the scene of the traveled road.

The table below illustrates exemplary configurations based on accuracy and speed of using secondary clear path modules in cooperation with the primary clear path module. The baseline as shown in the table below represents the primary clear path detection module.

| Configuration | Accuracy | Speed (sec) |
| --- | --- | --- |
| Baseline | 93.93% | 0.736 |
| Baseline + Adaptation Detection | 93.38% | 0.774 |
| Baseline + Road Structure Detection | 93.94% | 1.411 |
| Baseline + Temporal Coherence Detection | 91.51% | 2.21 |
| Baseline + Temporal Coherence + Adaptation Detection | 94.63% | 2.25 |
| Baseline + Temporal Coherence + Adaptation + Road Structure Detection | 94.64% | 2.759 |

It should be understood that the configurations and values shown herein are exemplary and that the table can include more or less information than what is shown. For example, various configurations may utilize that top-down view techniques and/or on-line techniques in addition to other known techniques without deviating form the scope of the invention. In addition, speed data and accuracy data may be different dependent upon environment, hardware, and software utilized. As is shown, as the accuracy increases, processing time to identify the clear path utilizing the selected clear path modules increases. Alternatively, as less clear path detection modules are utilized, the processing time decreases as does the accuracy.

To reconfigure the clear path detection system so that only the selected secondary clear path detection modules are utilized, the vehicle may be serviced by a technician at a service center or other trained personnel that are able to access and reconfigure the software for executing the clear path detection system. If the results of the secondary clear path detection modules are to be weighted, then the system automatically determines the weights based equal distribution of weighting between the secondary clear path detection modules or weighting may be based on a regression technique.

While certain embodiments of the present invention have been described in detail, those familiar with the art to which this invention relates will recognize various alternative designs and embodiments for practicing the invention as defined by the following claims.

What is claimed is:

1. A reconfigurable clear path detection system for a vehicle comprising:
    an image capture device for capturing images of a scene in a path of travel;
    a primary clear path detection module determining a clear path in an input image captured from the image capture device;
    a plurality of secondary clear path detection modules, each secondary clear path detection module configured to independently assist in identifying a respective clear path of the road of travel in the input image, wherein one or more of the secondary clear path detection modules are selectively enabled for assisting in identifying the clear path of the road of travel, wherein only the selectively enabled secondary clear path detection modules are used to identify the clear path of the road of travel in the input image; and
    a fusion module for collectively analyzing the clear path detection results of the primary clear path detection module and the selectively enabled secondary clear path detection modules for identifying the clear path in the input image.

2. The reconfigurable clear path detection system of claim 1 wherein the plurality of secondary clear path detection modules includes a temporal coherence module, wherein a clear path detection probability from a previous time step frame is utilized to update a clear path detection probability in a current time step frame, wherein a probability update is based on a weighted inter-frame matching technique which is derived from vehicle motion and an on-ground plane assumption.

3. The reconfigurable clear path detection system of claim 1 wherein the plurality of secondary clear path detection modules includes a top-down view classification module, wherein a top-down view image is generated from the input image, and wherein features are extracted from the top-down view image for identifying the clear path.

4. The reconfigurable clear path detection system of claim 1 wherein the plurality of secondary clear path detection modules includes a road structure detection module, wherein vanishing point and pass-vanishing point line tracking is performed and learning-based road edge detection is applied for identifying road edges and road structure in the input image.

5. The reconfigurable clear path detection system of claim 1 wherein the plurality of secondary clear path detection modules includes an on-line similar scene module, wherein the on-line similar scene module utilizes an image captured in real-time and compares the captured image to various images retrieved from a database that are previously labeled or identified.

6. The reconfigurable clear path detection system of claim 1 wherein a combination of the primary clear path detection module and the selectively enabled clear path detection modules are collectively analyzed by weighting each of the results of the primary clear path detection module and the selectively enabled secondary clear path detection modules.

7. The reconfigurable clear path detection system of claim 6 wherein weighting each of the results of the primary clear path detection module and the selectively enabled secondary clear path detection modules are represented by the formula as follows:

$$P_{fuse}(c) = \frac{w_{offline} \cdot P_{offline}(c) + w_{online} \cdot P_{online}(c) + w_{topview} \cdot P_{topview}(c) + w_{adapt} \cdot P_{adapt}(c)}{w_{offline} + w_{online} + w_{topview} + w_{adapt}}$$

where $P_{fuse}(c)$ is a fused clear-path likelihood, $P_{offline}(c)$ is a primary clear path detection probability classified by an offline trained SVM model, $P_{online}(c)$ is an online similar scene classification probability, $P_{topview}(c)$ is a top-down view classification probability, and $P_{adapt}(c)$ is the adaption probability, and $w_{offline}$, $w_{online}$, $w_{topview}$, and $w_{adapt}$ are weight values.

8. The reconfigurable clear path detection system of claim 7 wherein the clear path is further determined as a function of the identified road structure and is represented by the following formula:

$$P_{rdstr\_fuse}(c) = \text{Conf}_{rd\_edge}(c) \cdot P_{fuse}(c)$$

where—$P_{rdstr\_fuse}(c)$ is a probability of the clear path as a function of the identified road structure, $P_{fuse}(c)$ is the probability of the clear path for a respective segmented patch generated by a first fusion module, and $\text{Conf}_{rd\_edge}$ is a confidence map with regions inside and outside of the identified road edges being assigned different confidence values.

9. The reconfigurable clear path detection system of claim 1 wherein the selectively enabled secondary clear path detection modules are selected based on a trade-off between a processing time and accuracy of identifying the clear path in the input image.

10. The reconfigurable clear path detection system of claim 1 wherein the selectively enabled secondary clear path detection modules utilize time-displaced captured images of the traveled road for identifying the clear path in the input image.

11. The reconfigurable clear path detection system of claim 10 wherein the time-displaced captured images of the traveled road are captured within a predetermined frame rate of capturing the input image.

12. The reconfigurable clear path detection system of claim 1 further comprising an output device for displaying the clear path of road to a driver of a vehicle.

13. The reconfigurable clear path detection system of claim 1 further comprising an object detection system, the object detection system utilizing the identified clear path for detecting objects in the input image.

14. A method for detecting a clear path of a road of travel for a vehicle, the method comprising the steps of:
capturing images of a scene in a path of travel by an image capture device;
determining a clear path in an input image by a primary clear path detection module, the primary clear path detection module analyzing the input image from the captured image device, the primary clear path detection module segmenting the input image into a plurality of patches, determining probability values for each of the patches representing a likelihood of whether a respective patch is a clear path of travel, associating feature data of the input image with the segmented patches, and applying a trained classifier for identifying a clear path of travel in the input image based on the feature data and the corresponding probability values;
providing a plurality of secondary clear path detection modules for independently identifying a respective clear path of the travel in the input image;
selectively enabling one or more of the secondary clear path detection modules for identifying the clear path of the travel, wherein only the selectively enabled secondary clear path detection modules are used for identifying the clear path of the road of travel in the input image;
a fusion module collectively analyzing the clear path detection results of the primary clear path detection module and the selectively enabled secondary clear path detection modules for identifying the clear path in the input image.

15. The method of claim 14 wherein the plurality of secondary clear path detection modules includes a temporal coherence module, wherein a clear path detection probability from a previous time step frame is utilized to update a clear path detection probability in a current time step frame, wherein a probability update is based on a weighted interframe matching technique which is derived from vehicle motion and an on-ground plane assumption.

16. The method of claim 14 wherein the plurality of secondary clear path detection modules includes a top-down view classification module, wherein a top-down view image of the captured image is generated from one or more captured input images exterior of the vehicle, and wherein features are extracted from the top-down view image, and wherein extracted features from the top-down view are applied to a classifier for identifying the clear path in the input image.

17. The method of claim 14 wherein the plurality of secondary clear path detection modules includes a road structure detection module, wherein vanishing point and pass-vanishing point line tracking is performed and learning-based road edge detection is applied for identifying road edges and road structure in the input image.

18. The method of claim 14 wherein the plurality of secondary clear path detection modules includes an on-line similar scene module, wherein the on-line similar scene module utilizes an image captured in real-time and compares the captured image to various images retrieved from a database that are previously labeled or identified.

19. The method of claim 14 wherein the fusion module weights the result of the primary clear path detection module and the results of the selectively enabled secondary clear path detection modules for identifying the clear path in the input image.

20. The method of claim 19 wherein weighting each of the results of the primary clear path detection module and the selectively enabled secondary clear path detection modules are represented by the formula as follows:

$$P_{fuse}(c) = \frac{w_{offline} \cdot P_{offline}(c) + w_{online} \cdot P_{online}(c) + w_{topview} \cdot P_{topview}(c) + w_{adapt} \cdot P_{adapt}(c)}{w_{offline} + w_{online} + w_{topview} + w_{adapt}}$$

where $P_{fuse}(c)$ is a fused clear-path likelihood, $P_{offline}(c)$ is a primary clear path detection probability classified by an offline trained SVM model, $P_{online}(c)$ is an online similar scene classification probability, $P_{topview}(c)$ is a top-down view classification probability, and $P_{adapt}(c)$ is the adaption probability, and $w_{offline}$, $w_{online}$, $w_{topview}$, and $w_{adapt}$ are weight values.

21. The method of claim 20 wherein the clear path is further determined as a function of the identified road structure and is represented by the following formula:

$$P_{rdstr\_fuse}(c) = \text{Conf}_{rd\_edge}(c) \cdot P_{fuse}(c)$$

where—$P_{rdstr\_fuse}(c)$ is a probability of the clear path as a function of the identified road structure, $P_{fuse}(c)$ is the probability of the clear path for a respective segmented patch generated by a first fusion module, and $\text{Conf}_{rd\_edge}$ is a confidence map with regions inside and outside of the identified road edges being assigned different confidence values.

22. The method of claim 14 wherein the enabled secondary clear path detection modules are selected based on trade-off between a processing time and accuracy of identifying the clear path in the input image.

23. The method of claim 14 wherein the selectively enabled secondary clear path detection modules utilize time-displaced captured images of the path of travel for identification of the clear path in the input image.

24. The method of claim 14 wherein the time-displaced captured images of the path of travel include images captured within a previous predetermined time period.

25. The method of claim 14 further comprising the step of displaying the clear path of travel to a driver of the vehicle using an output display device.

26. The method of claim 14 further comprising the step of providing the identified clear path of travel to an object detection system for detecting objects in the input image.

* * * * *